UNITED STATES PATENT OFFICE.

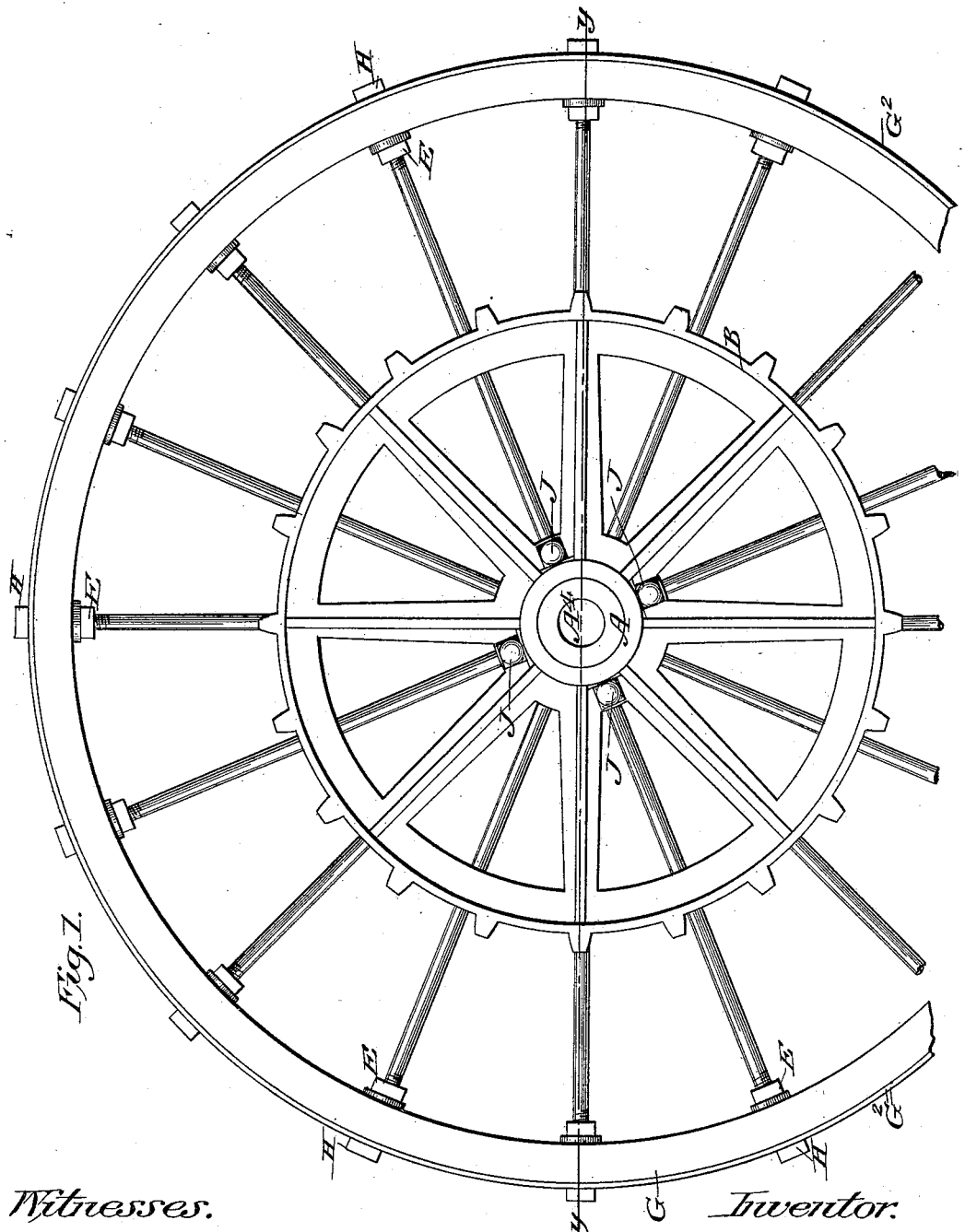

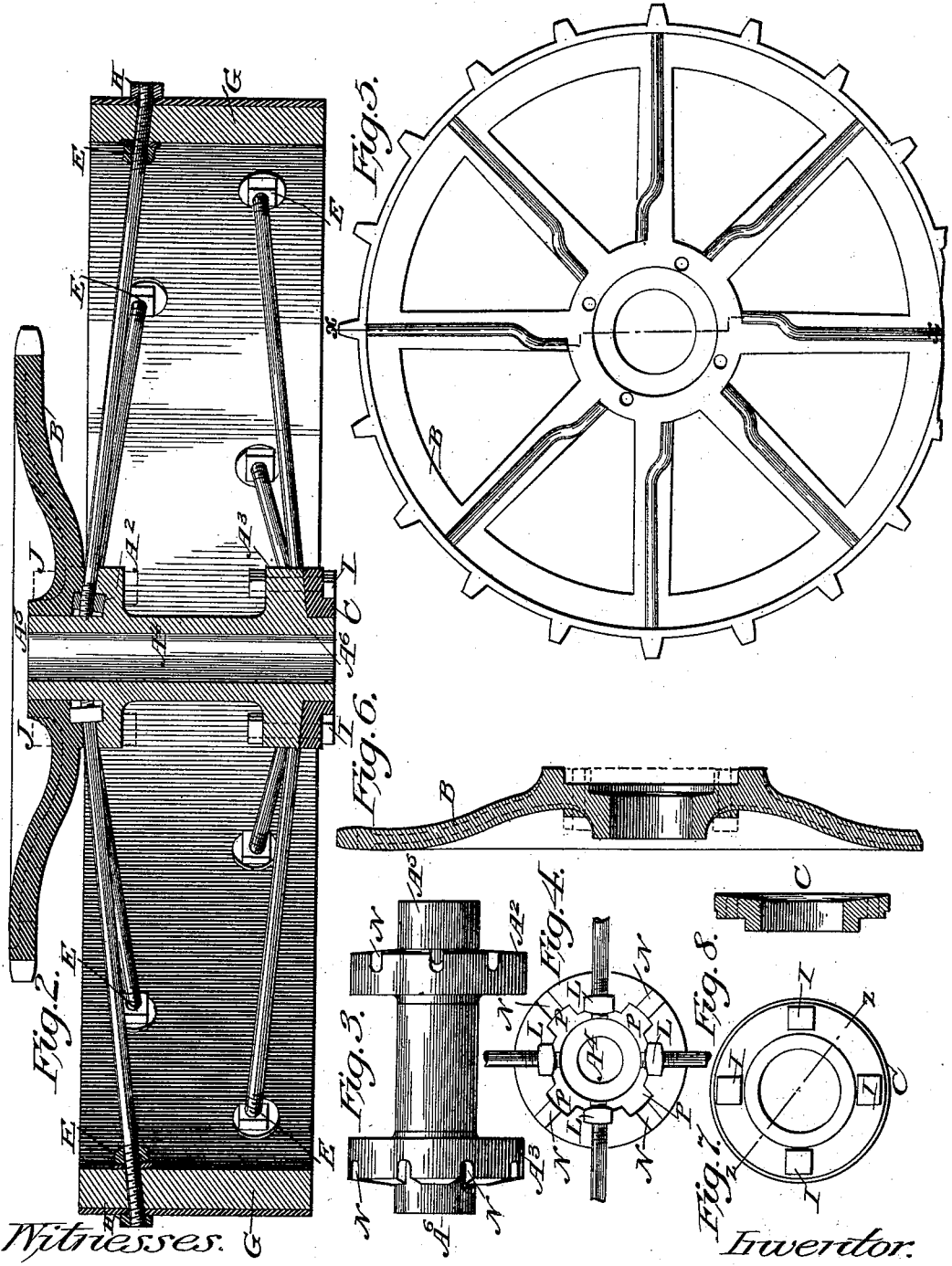

GEORGE H. CARVER, OF PLANO, ILLINOIS, ASSIGNOR TO THE PLANO MANUFACTURING COMPANY, OF SAME PLACE.

HARVESTER-WHEEL.

SPECIFICATION forming part of Letters Patent No. 463,739, dated November 24, 1891.

Application filed April 20, 1891. Serial No. 389,709. (No model.)

*To all whom it may concern:*

Be it known that I, GEORGE H. CARVER, a citizen of the United States, residing at Plano, in the county of Kendall and State of Illinois, have invented a new and useful Improvement in Harvester-Wheels, of which the following is a specification.

My improvement relates to the driving or ground wheel of the machine, from which motion is communicated to the operative mechanism of the harvester.

The object of my improvement is to so attach the spokes of the wheel in the hub that they may adjustably act upon the rim of the wheel, so as to force it outward, and at the same time be able to hold the rim by a tensional strain in proper relation to the hub of the wheel. I attain this object by the construction illustrated in the drawings, in which—

Figure 1 is a side elevation of the wheel, looking from the side to which the main sprocket is attached. Fig. 2 is a sectional view of one-half of the wheel, taken on a line, as $y\ y$, Fig. 1, across the wheel and at right angles to the edges of the rim. Fig. 3 is an elevation or side view of the hub of the wheel. Fig. 4 is an end view of the same, showing four of the spokes as adjustably fastened in the hub. Fig. 5 is an inside view of the main driving-sprocket. Fig. 6 is a cross-section of the same on the line $x\ x$, Fig. 5. Fig. 7 is a view of the outer side of an annular plate or cap that serves to hold the spokes in place. Fig. 8 is a central cross-section of the same on a line, as $z\ z$, Fig. 7.

Similar letters refer to similar parts throughout the several views.

The wheel-rim G is steamed and bent in the ordinary way, and held in proper shape by a tire $G^2$. The hub of the wheel is preferably of cast metal, and having a central longitudinal aperture $A^4$, which serves for a box for an axle inserted therein, and upon which the wheel runs. The hub is provided with radial flanges $A^2\ A^3$. These flanges are provided with radial spoke-grooves N on the sides toward the ends of the hub to receive the spokes. Each flange has eight grooves, (more if needed,) and the grooves in one flange are arranged diagonally in relation to the grooves in the other, so that the spokes when placed therein may enter the rim diagonally to each other, as shown in Fig. 2. The sides of the flanges wherein the spokes are attached are arranged at a slight inclination to the axis of the wheel, so that the spokes may brace toward each other across the rim of the wheel. The flanges are placed at suitable distances from the ends of the hub to leave projecting members $A^5\ A^6$. These members are of such length as to correspond with the thickness of parts which fit thereon—viz., an annular plate or cap C slides loosely upon the member $A^6$ and the main sprocket B fits in a similar manner upon the member $A^5$. The sprocket B and cap C have inclined surfaces corresponding to the opposing flange surfaces.

The hub-flanges have recesses P for the reception of nuts K, into which the spokes are screwed. These recesses are adapted to hold the nuts from turning while the spokes are turned within them, so as to cause the inner ends to abut firmly against the member $A^5$ or $A^6$, as the case may be. Bolts I J fasten the cap C and sprocket B to the wheel-hub and clamp the spokes. The spokes have long threads upon their outer ends, which pass through holes in the rim G, and are held in place by inner nuts E and outer nuts H.

The spokes are first placed in the rim with tightening-nuts in place, the inner ends of the spokes having the nuts close to the end are placed in the grooves, and the clamping-plate bolted on. Then the spokes are turned round until the ends bring up or abut against the part $A^5$ or $A^6$, as the case may be. The wheel-rim is then adjusted as desired.

What I claim as new, and desire to secure by Letters Patent, is—

The combination, in a harvester-wheel, of a rim provided with spoke-apertures in which the outer ends of the spokes are adjustably attached, a hub provided with radial spoke-grooves, having recesses or enlargements to receive adjusting-nuts upon the inner ends of the spokes, spokes connecting the rim and hub, a clamping-plate bolted to the wheel-hub to confine the spokes in the radial grooves of the hub against lateral displacement, and an abutting surface against which the inner ends of the spokes abut or rest, for the purpose as specified.

GEORGE H. CARVER.

Witnesses:
L. G. ERWIN,
G. G. HUNT.